T. P. WILCOX.
Improvement in Gates.
No. 125,511.                        Patented April 9, 1872.
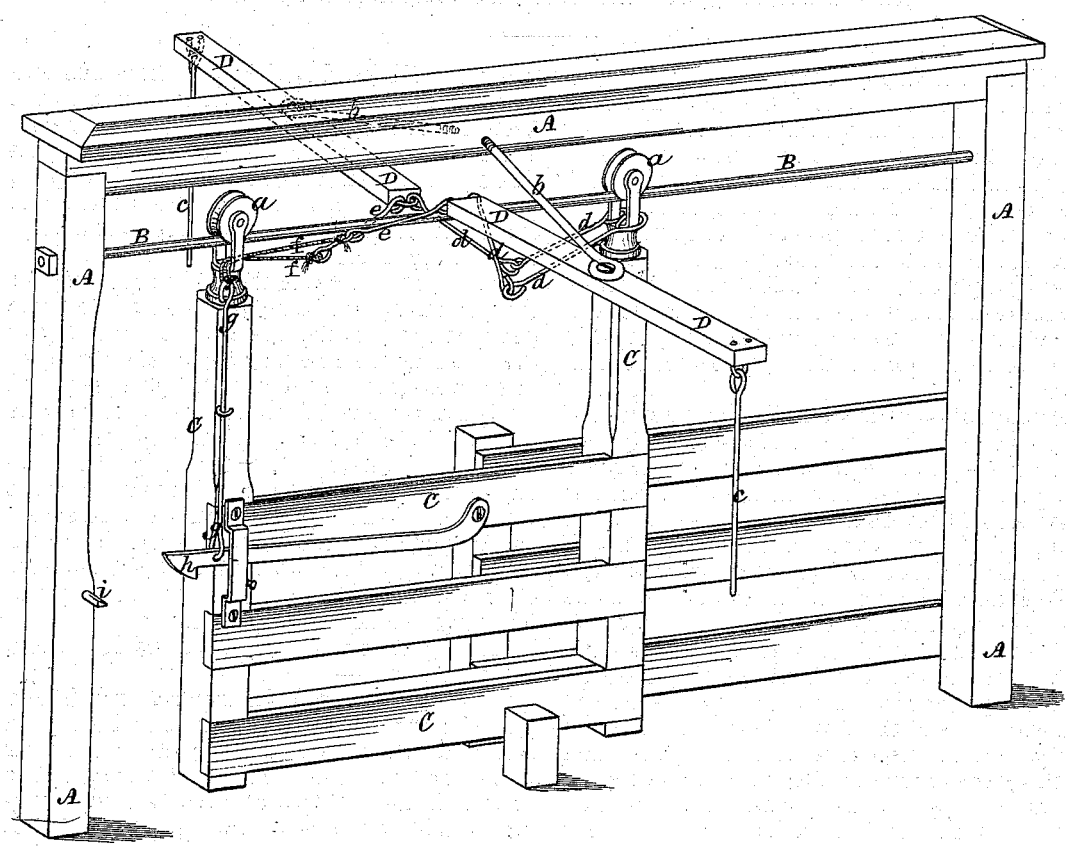
Witnesses.
Wm. J. Henderson
Edmund Masson
Inventor.
Thomas P. Wilcox.
By Atty A. B. Stoughton.

125,511

UNITED STATES PATENT OFFICE.

THOMAS P. WILCOX, OF HEBRON, INDIANA.

IMPROVEMENT IN GATES.

Specification forming part of Letters Patent No. 125,511, dated April 9, 1872.

*To all whom it may concern:*

Be it known that I, THOMAS P. WILCOX, of Hebron, in the county of Porter and State of Indiana, have invented certain new and useful Improvements in Farm and other Gates; and I do hereby declare the following to be a full, clear, and exact description of the same, reference being had to the accompanying drawing making a part of this specification, in which—

Figure 1 represents one of the gates and its appliances in perspective, and as partially open, so as to more distinctly show its several parts.

My invention consists in the arrangement of devices by which a "to and fro" gate is opened and closed—viz., the pivoted and swinging levers, and the linked and flexible connections between said levers and the gate—so that the swinging of said levers in one direction will open, and in the other direction close said gate.

To enable others skilled in the art to make and use my invention, I will proceed to describe the same with reference to the drawing.

A represents a frame for supporting the gate and its appliances. A rod, B, is supported in the end posts of the frame A, and on this rod the gate C is suspended, and runs back and forth by the grooved pulleys *a a* in the tops of the gate-posts. To the horizontal top portion of the frame A, and on each side of it, there is arranged an arm, *b*, parallel, or nearly so, with the road or pathway leading to and through the gate-way, and to these arms *b* there is pivoted, respectively, a swinging lever, D, having a pendent rod, link, cord, or chain, *c*, attached to their outer ends. To the inner ends of these swinging levers, respectively, are connected two sets of links, *d e;* those, *d*, extending and fastened to the top of what may be termed the heel-post of the gate, the others, *e*, being connected, through the cords or chains *f* that pass through an opening in the top of the front post, to a vertical rod, *g*, that is attached at its lower end to the latch *h*, which catches over a keeper, *i*, in the frame A.

To operate this gate it is only necessary for the person approaching the gate to seize the pendant *c* and swing the lever D one way or the other, as the case may be, whether to open or close the gate. And when the gate is opened by vibrating one of the levers D, it may be closed by the person, after they have passed through, by seizing the pendant on the opposite lever and vibrating its lever in an opposite direction. When the mechanism is released, the dropping of the links *d d* by their own weight brings the two levers D around into their parallel position again, where they can be easily reached and operated.

Having thus fully described my invention, what I claim is—

The combination of the frame A, rod B, and gate C, arranged to be supported and to run on said rod, with the vibrating levers D and their linked or flexible connections *d e*, attached to or with the gate and its latch, so that the swinging of said levers upon their pivots will first raise the latch and open the gate, or close the gate and latch, as the case may be, as herein described and represented.

THOMAS P. WILCOX.

Witnesses:
   S. IRVIN,
   GEO. C. MOSIER.